United States Patent
Dehlke

(10) Patent No.: US 8,302,293 B2
(45) Date of Patent: Nov. 6, 2012

(54) PROCESSING TOOL AND METHOD FOR TRANSFERRING A COMPONENT FROM A READY POSITION INTO A PROCESSING POSITION

(75) Inventor: Klaus Dehlke, Windsbach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 1089 days.

(21) Appl. No.: 12/176,707

(22) Filed: Jul. 21, 2008

(65) Prior Publication Data

US 2009/0279991 A1    Nov. 12, 2009

(30) Foreign Application Priority Data

Jul. 19, 2007  (DE) .................... 20 2007 010 158 U

(51) Int. Cl.
B23P 19/00 (2006.01)

(52) U.S. Cl. ............ 29/798; 29/464; 29/466; 29/467; 29/525; 221/309; 221/310; 227/15; 227/18

(58) Field of Classification Search .......... 29/432, 29/464, 466, 467, 468, 525, 798, 258–262, 29/265, 525.1; 227/15, 16, 17, 18; 221/307, 221/309, 310
See application file for complete search history.

(56) References Cited

U.S. PATENT DOCUMENTS

| | | | | |
|---|---|---|---|---|
| 1,503,861 A * | 8/1924 | Stimpson | ........... | 269/254 R |
| 1,506,788 A * | 9/1924 | Stimpson | ........... | 227/116 |
| 2,462,802 A * | 2/1949 | Buckley | ........... | 227/141 |
| 2,611,289 A * | 9/1952 | Frank | ........... | 81/125 |
| 3,013,271 A * | 12/1961 | Carpinella | ........... | 227/141 |
| 3,412,897 A * | 11/1968 | Slater | ........... | 221/226 |
| 4,454,650 A * | 6/1984 | Silver | ........... | 29/818 |
| 5,636,426 A * | 6/1997 | Luckhardt et al. | ........... | 29/432 |
| 5,697,521 A * | 12/1997 | Dixon | ........... | 221/297 |
| 6,263,561 B1 * | 7/2001 | Sickels et al. | ........... | 29/798 |
| 6,557,727 B1 * | 5/2003 | Robertson | ........... | 221/278 |
| 6,578,258 B1 * | 6/2003 | Boyer et al. | ........... | 29/798 |
| 6,631,827 B2 * | 10/2003 | Goodsmith et al. | ........... | 221/238 |
| 6,912,776 B2 * | 7/2005 | Vrana | ........... | 29/798 |
| 6,925,698 B2 * | 8/2005 | Goodsmith et al. | ........... | 29/432.1 |
| 6,957,483 B2 * | 10/2005 | Woods | ........... | 29/798 |
| 2009/0217506 A1 | 9/2009 | Schmidt | | |

FOREIGN PATENT DOCUMENTS

| | | |
|---|---|---|
| DE | 19700271 A1 | 9/1997 |
| DE | 102005056378 A1 | 5/2007 |
| DE | 102006013651 B4 | 9/2008 |
| DE | 102006013652 B4 | 12/2010 |

* cited by examiner

*Primary Examiner* — David Bryant
*Assistant Examiner* — Ryan J Walters
(74) *Attorney, Agent, or Firm* — Laurence A. Greenberg; Werner H. Stemer; Ralph E. Locher

(57) ABSTRACT

In order to ensure reliable feeding in particular of a clinch nut (M) from a ready position (16) into a processing position, the processing tool designed as a press-in tool (2) has a guide element (14), through which the clinch nut (M) is pressed into the processing position by means of a punch (8) against an elastic holding force exerted by the guide element (14). The guide element (14) is designed in particular as a slotted bush and is arranged as an insert in a hold-down (12).

19 Claims, 2 Drawing Sheets

US 8,302,293 B2

PROCESSING TOOL AND METHOD FOR TRANSFERRING A COMPONENT FROM A READY POSITION INTO A PROCESSING POSITION

BACKGROUND OF THE INVENTION

Field of the Invention

The invention relates to a processing tool and a method for transferring a component from a ready position into a processing position, in particular for pressing a clinch element into a workpiece.

When components are being inserted into workpieces, in particular metal sheets, accurate guidance of the components is regularly required during the processing operation.

In particular in the case of processing tools and methods in which the component is inserted in a positive-locking and/or frictional manner by means of a forming operation, defined insertion of the component into the workpiece is necessary for a qualitatively high-grade connection between the component and the workpiece. This applies in particular to those methods in which the components are inserted into the workpiece by means of a press-in tool. The components in this case are in particular pierce or clinch parts which are formed themselves when they are being pressed in or which form the workpiece when they are being pressed in. During the press-in operation, these components are often pressed against a die as counter-holding element. For the forming, as accurate an orientation and guidance of the component as possible with respect to this die is necessary.

In this case, the expression "components" refers in particular to "clinch nuts", that is to say joining elements which are inserted by pressing into a pre-pierced sheet and which have a tapped hole for fastening a screw. The same applies to pierce nuts, which are inserted by a punching operation into a sheet that is not pre-pierced. In addition to nuts, "clinch studs" or other joining elements may also be provided. The clinch studs normally have an external thread.

Nowadays, in particular in the automobile industry sector, these components are fed to the processing tool in an automated manner. During the processing, the components are typically fed in a singularized manner from a magazine to the processing tool into a ready position. The component is brought from this ready position into a processing position before the actual setting operation, during which the component is inserted into the sheet, is effected. In the processing position, the component bears, for example, against the sheet and/or the die before the setting and/or forming operation starts. Both the transfer from the ready position into the processing position and the actual pressing-in are typically effected in this case by means of a press-in punch. Grippers, for example, may be provided for the accurate guidance of the components, said grippers holding the joining element in a clamping manner in the ready position, which is also referred to as transfer position.

During the processing operation, the processing tool normally moves against the workpiece and presses the latter with the joining element or by means of a "hold-down" against a seating (die). The component itself is directed in the process from the ready position through the hold-down into the processing position. In order to prevent the nuts from falling through, lateral gripper fingers are attached, for example at the end, to the punch, said gripper fingers holding the component between them in a clamping manner. In addition, a permanent magnet for holding the component may also be provided on the punch.

However, there is the problem in this case that, due to contamination, wear or even vibrations, the components are not reliably held, which may lead to serious consequential faults during the automated sequence. There is also the risk of the respective component only being located imprecisely in the ready position and of being centered only inaccurately with regard to the die, such that the connection between the component and the sheet does not achieve the requisite quality and has to be regarded as scrap.

BRIEF SUMMARY OF THE INVENTION

The object of the invention is to ensure reliable transport of such a component from a ready position into a processing position in a processing tool.

The object is achieved according to the invention by a processing tool and by a method for transferring a component from the ready position into the processing position, the processing tool comprising a punch which transfers the component from the ready position into the processing position. The processing tool comprises a guide element, by means of which the component is directed from the ready position into the processing position. The guide element is designed in such a way that it exerts an elastic holding force on the component in such a way that, during the processing operation, the punch presses the component through the guide element against the elastic holding force.

The component here is in particular a clinch joining element, such as a pierce or clinch nut or also a clinch stud. The receptacle in which the centering element engages is, in the case of the clinch nut, the tapped hole or at least the marginal countersink of the tapped hole. However, the receptacle may also be, for example, a tool receptacle of a screw.

Due to this configuration, the design of the guide element itself reliably prevents the component from falling out or from falling through when being transferred into the processing position. This is because the component is no longer held by the punch itself but rather by the guide element, through which it must be actively pressed by means of the punch.

In this case, the guide element is preferably designed in such a way that it exerts an elastic holding force over most of its length and in particular over its entire length, that the component therefore has to be pressed through the guide element over the entire length of said guide element while being acted upon by a force. The elastic force is therefore exerted by the guide element continuously, and preferably in a continuously increasing manner, over its length.

The guide element is in this case expediently designed as a bush having an elastic wall region. Reliable guidance is ensured by the bush-shaped configuration. The free inside diameter of the bush at least in the bottom region toward the processing position is in this case smaller than the outside diameter of the component, such that the latter cannot fall through.

In order to achieve as simple a design as possible, the bush has elongated slots on its end side facing the processing position, such that the bush wall is formed by a plurality of strip-shaped wall regions, which are elastic insofar as they can be pressed away outward in the radial direction when the component is being pressed through.

To exert the elastic holding force, the guide element preferably has a spring element and/or is formed from an elastic material, such as, for example, spring steel or a plastic.

According to a preferred development, the guide element tapers conically in the press-in direction. As a result, with increasing press-in direction, the elastic force acting in the radial direction becomes increasingly larger, such that an accurate centered position of the joining element is ensured in the processing position before the actual press-in operation finally starts.

The guide element is expediently arranged as an insert in a hold-down. Due to this configuration, the two functions, namely reliable guidance of the component on the side and the holding-down of the workpiece on the other side, are separated, such that the two components can be optimally designed for their respective function. To this end, the hold-down is preferably made of a sufficiently strong material, in particular steel, in order to be able to transmit the necessary holding-down forces or in order to be less susceptible to wear. Furthermore, provision is expediently made for the guide element to have an in particular circumferential collar which is clamped between the hold-down and another mounting plate. The guide element is held overall concentrically in the hold-down. As an alternative to this configuration, the guide element itself may form the hold-down.

According to an expedient development, a centering element is provided at the punch end, said centering element being designed for inserting into a receptacle of the component, to be precise in such a way that the component can be transferred into the processing position in a centered manner. In this case, "centered orientation" refers in particular to coaxial orientation with the punch or press direction.

Due to the centering element on the punch, the joining element is brought into coaxial orientation relative to the punch axis or is reliably held in this coaxial orientation during the displacement of the joining element toward the sheet and during the setting operation. To this end, the centering element engages in the receptacle free of play, and preferably in a clamping manner. Due to the engagement, a form fit is formed between the centering element and the receptacle in the radial direction perpendicularly to the punch and press-in direction, such that, in addition to the centering, the joining element also cannot fall laterally out of the ready position. A clamping force also preferably acts between the centering element and the receptacle, such that the joining element is also held in the axial or punch direction.

According to an expedient development, the centering element tapers in the press-in direction. The centering element is in this case designed in particular as a cone or truncated cone. This configuration makes possible automatic centering of the component coaxially to the punch direction when the centering element is being moved into the receptacle.

The receptacles normally comprise an insertion bevel, i.e. they are provided with a slight insertion taper at their margin. In the case of a clinch nut, this serves for easier insertion of a screw. Provision is expediently made for the centering element to be designed in such a way that it interacts merely with the insertion bevel. In particular, the conicity of the centering element and that of the insertion bevel are therefore adapted to one another, i.e. the insertion bevel and the centering element have at least approximately the same conicity. As a result, for example, damage to the internal thread of the clinch nut is avoided.

The component is held in the ready position by a holding device. In order to reliably achieve automatic centering, the holding device is expediently designed in such a way that the component is held elastically, and in particular is pressed with a spring or elastic force in the direction of the centering element. When the punch is shifted in the axial direction, the centering element plunges into the receptacle. In the case of eccentric orientation to begin with, the joining element is pressed automatically by the positively driven centering element into the centered position against the elastic holding force. This elastic mounting of the joining element therefore enables a compensating movement of the joining element. An elastic force acting not only in the radial direction but also in the axial direction is generally expediently exerted on the component.

The holding device preferably comprises at least one elastically mounted latch or gripping arm. To this end, the latch arm is preferably mounted such as to be pivotable against a spring force. The latch arm has a special contour, with which the joining element is enclosed at least in sections, such that positioning of the component free of play in the ready position is ensured.

In a preferred configuration, to detect whether a joining element is located in the holding space, a sensor, for example a pressure sensor, against which the joining element is pressed is provided laterally in the holding space. The sensor is in this case part of a control device which controls the automated press-in operation and which detects by means of the sensor whether a joining element is located in the ready position before the setting operation.

An exemplary embodiment is explained in more detail below with reference to the figures. In the drawing, in each case in schematic and simplified illustrations:

DESCRIPTION OF THE INVENTION

Parts acting in the same way are provided with the same designations in the figures.

Figure 2:
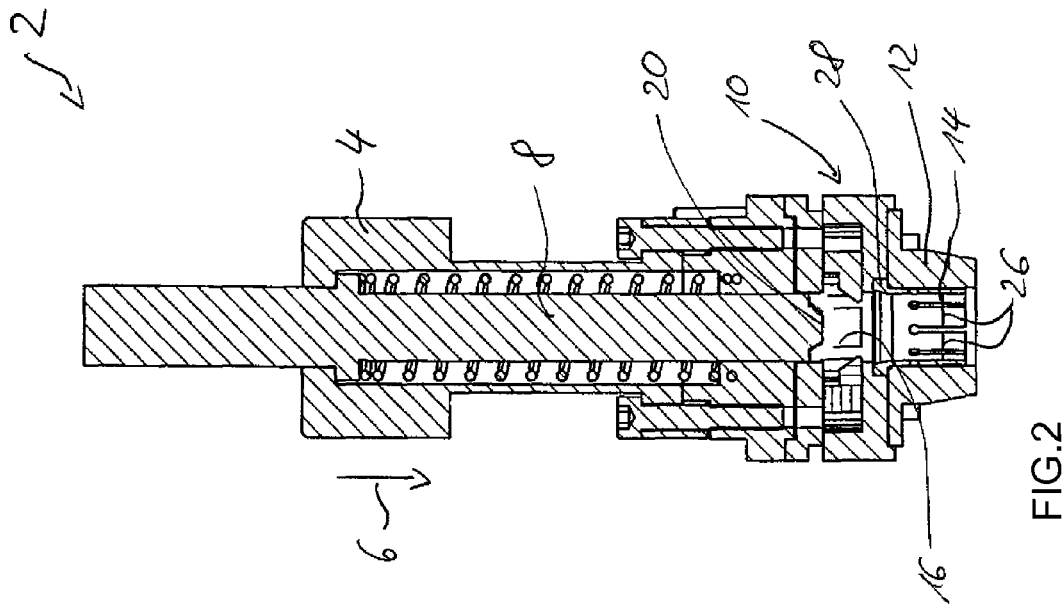
FIG. 2 shows a second section, rotated by 90°, through the press-in tool according to FIG. 1.
Figure 1:
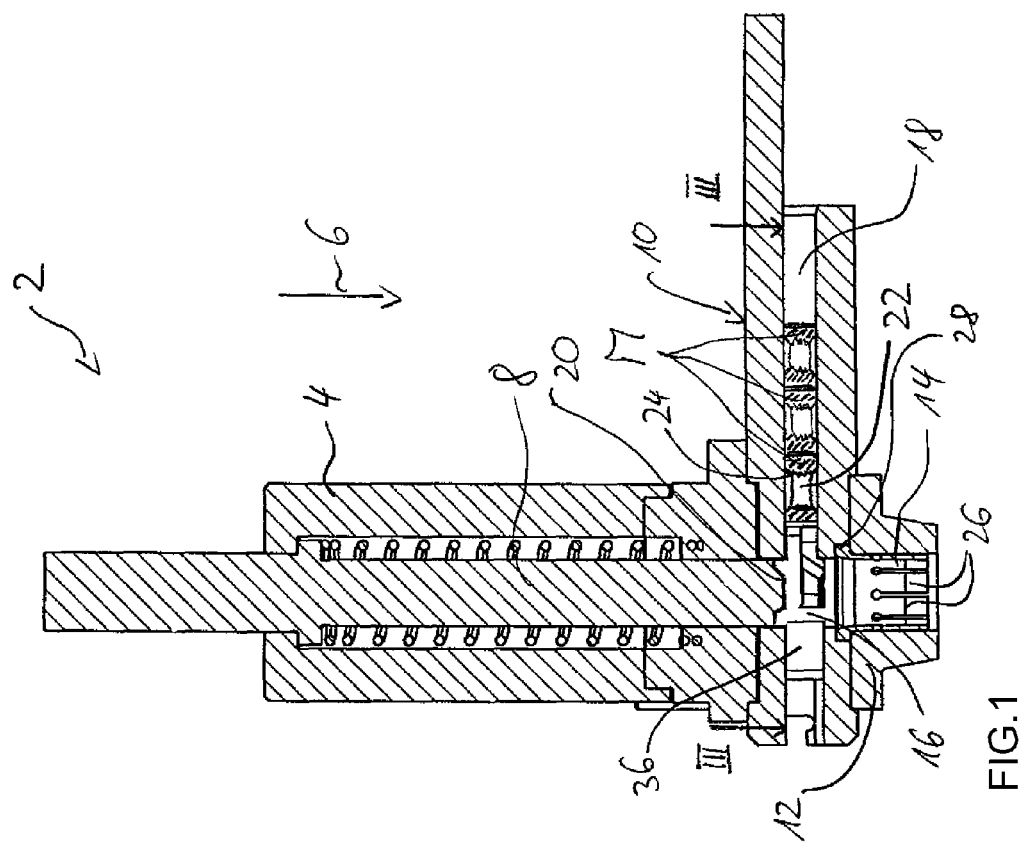
FIG. 1 shows a first section through a processing tool designed as a press-in tool.

The press-in tool 2 shown in FIGS. 1 and 2 serves to press components, namely in particular clinch nuts M, into a pre-pierced sheet (not shown in any more detail). In this case, the press-in tool 2 comprises a punch 8 movable in a cylinder 4 in the press-in or axial direction 6. Said punch 8 is held in a spring-loaded manner in its top initial position in the exemplary embodiment. The cylinder 4 is fastened to a plate-shaped feed unit 10. A hold-down 12 having a bush-shaped guide element 14 inserted therein is fastened to the underside of said feed unit 10.

The nuts M to be pressed are fed to the press-in tool 2 from a storage container via the feed unit 10 individually into a ready position or holding space 16. To this end, in the exemplary embodiment, the feed unit 10 comprises a feed passage 18 in which the clinch nuts M are arranged in a row and are then pushed individually into the ready position 16.

During the setting or processing operation, the entire press-in tool 2 is moved in the axial direction 6 against the sheet, such that the hold-down 12 presses the sheet against a seating, in particular a die. For pressing the nut M into the sheet, the punch 8 is moved in a positively driven controlled manner, for example hydraulically, pneumatically or also electrically. In the process, the punch 8 presses the clinch nut M out of the ready position 16 and through the guide element 14 until the clinch nut M reaches the actual processing position at the end of the hold-down 12. For the subsequent pressing-in, the punch 8 exerts a defined press-in force on the clinch nut M, said press-in force normally leading to deformation of the clinch nut M and/or of the sheet.

The press-in tool 2 is an integral part of an automatic apparatus, such that the successive pressing-in of a multiplicity of components is effected automatically. To this end, the individual components are fed automatically to the press-in tool 2 and the latter is automatically actuated by means of a control device and if need be moved to a defined position for inserting the component into the sheet.

In order to ensure in this automated process a continuous, uninterruptible operation and the formation of qualitatively high-grade and uniformly sound joints between the components and the sheet, special measures are taken at the press-in tool 2 in order to guide the clinch nut M in the press-in tool 2 in a reliable and defined manner.

As can be seen from FIG. 1, a centering element 20 in the shape of a truncated cylinder is arranged at the bottom end of the punch 8. The truncated cylinder is in this case designed in such a way that it engages in a receptacle 22, designed as a tapped hole, of the clinch nut M. In the process, the centering element 20 comes into contact merely with an insertion bevel 24 or countersink of the tapped hole in order not to damage the internal thread.

Due to this configuration, self-centering of the clinch nut M is effected coaxially to the axial direction 6 of the punch 8. During the punch movement 8 downward in the axial direction 6, the clinch nut is guided in the centered position in a defined manner over the entire displacement distance.

When being transferred into the processing position, the clinch nut M is pressed by the guide element 14. The latter is designed like a guide bush, this guide bush being oriented in alignment with the punch 8. The guide element 14 itself is now designed in such a way that it exerts an elastic holding force on the clinch nut M, preferably over its entire axial length. To this end, longitudinal slots are incorporated in the wall of the guide element 14 in the exemplary embodiment, which define individual strip-shaped wall regions 26 which spring back elastically in the radial direction.

Provision is expediently made in this case for the interior space defined by the elastic wall regions 26 to taper conically in the axial direction 6.

In the exemplary embodiment, the guide element 14 is designed as a spring-steel insert which comprises, at the top end, a fastening ring 28 or flange, starting from which a plurality of spring tongues distributed around the circumference and forming the wall regions 26 extend downward in the axial direction 6. The guide element 14 is clamped in place with the fastening ring 28 between the hold-down 12 and the feed unit 10.

FIGS. 1 and 2 show the position of the punch 8 before it moves from above with its centering element 20 in front into the receptacle of the clinch element M. The latter is located directly below the centering element 20 in the ready position 16, in which it is held elastically by a holding device 30 (no nut M is located in the ready position 16 in FIGS. 1 and 2). The holding device 30 is part of the feed unit 10. The clinch element M is fed into this ready position 16 laterally, that is to say perpendicularly to the axial direction 6, via the feed passage 18. When the punch 8 moves into the clinch element M, the latter is automatically oriented coaxially to the punch 8.

Figure 3:
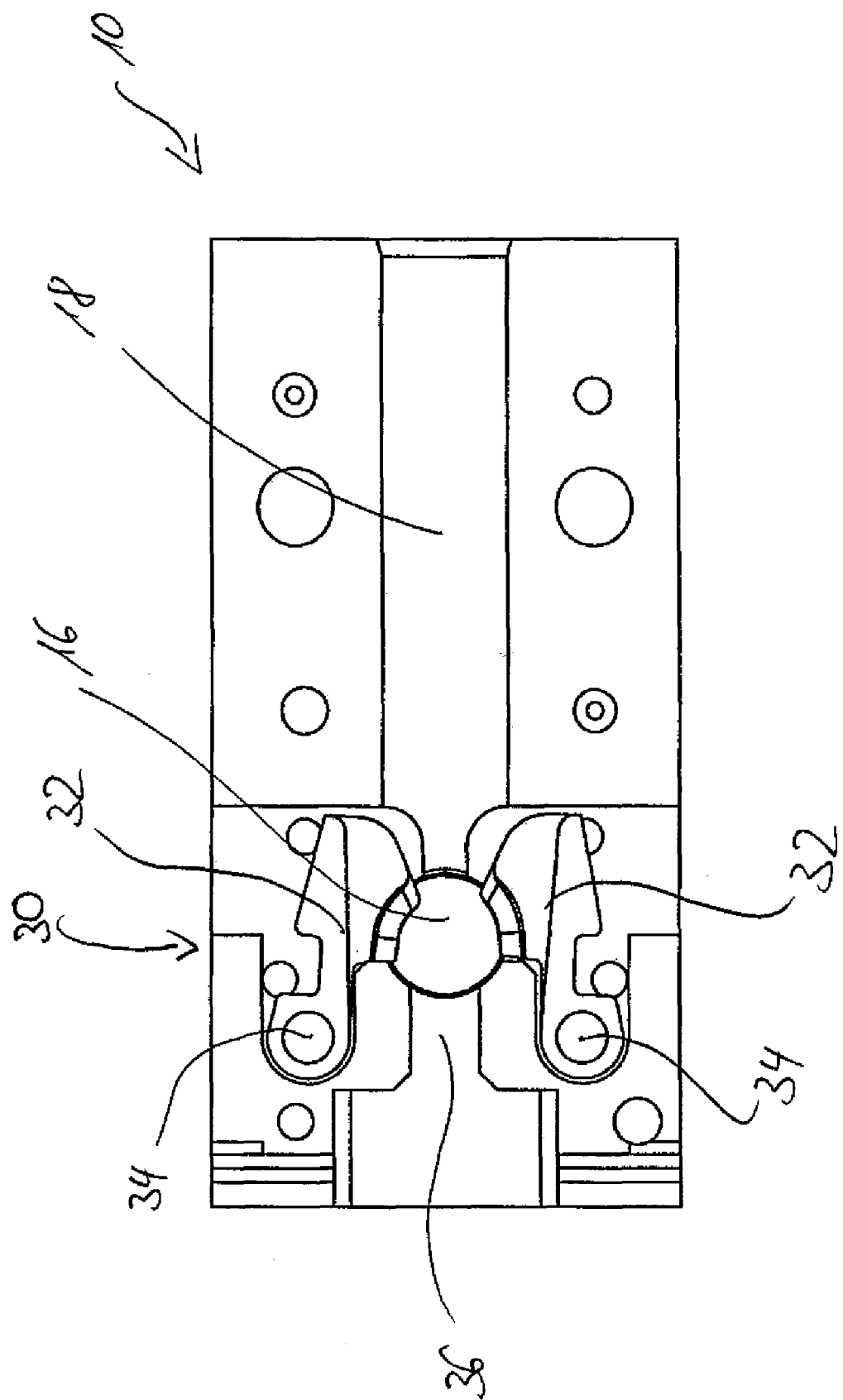
FIG. 3 shows a plan view according to arrows III-III of a plate-like subassembly having a feed passage and a latch system.

The configuration of the holding device 30 can be seen in particular from FIG. 3, which shows a plan view of a base subassembly of the feed unit 10. A mounting plate is additionally fastened to this base subassembly. The base subassembly of the feed unit 10 has the feed passage 18, which opens into the ready position 16. The clinch elements M can be put into the ready position 16 by being individually injected pneumatically or by being pushed in successively.

The holding device 30 comprises two lateral latch arms 32 which define the ready position 16 and which are mounted such as to be rotatable about a respective pivot axis 34. The latch arms 32 clear a feed opening for feeding the clinch elements M. In the process, the pivoting movement is effected against a restoring force exerted, for example, by a spring. The two latch arms 32 have respective holding jaws which taper conically and are shaped in a curve-like manner and between which the clinch element M is clamped.

Provided on the side opposite the feed passage 18 is a sensor 36 which detects whether there is a clinch element in the holding space 16.

In particular the interplay of the guide element 14, holding device 30 and centering element 20 ensures reliable, highly accurate feeding of the clinch elements, in particular clinch nuts M, into the processing position, such that the press-in operation is carried out in a reproducible manner and reliably in a defined quality.

The invention claimed is:

1. A processing tool for transferring a component from a ready position into a processing position, comprising:
   a punch configured to transfer the component from the ready position into the processing position;
   a guide element for guiding the component from the ready position into the processing position;
   said guide element exerting an elastic holding force on the component said guide element being a bush, said bush having elongated slots formed therein, said elongated slots defining a plurality of elastic wall regions, said elastic wall regions beginning at an end of said bush, said punch pressing the component through said guide element against the elastic holding force during transfer through said guide element;
   a hold-down for holding a workpiece against a seating, said guide element being an insert in said hold-down;
   a feed unit;
   said bush having a fastening flange, said fastening flange being clamped between said hold-down and said feed unit.

2. The processing tool according to claim 1, wherein the elastic holding force increases continuously over a length of said guide element.

3. The processing tool according to claim 1, wherein said guide element is formed from an elastic material being spring steel or a plastic.

4. The processing tool according to claim 1, wherein said guide element tapers along a press-in direction.

5. The processing tool according to claim 1, wherein said punch has a punch end with a centering element configured for insertion into a receptacle of the component, for transferring the component into the processing position in a centered manner.

6. The processing tool according to claim 5, wherein said centering element tapers in a press-in direction.

7. The processing tool according to claim 5, wherein said centering element is a truncated cone tapering in a press-in direction.

8. The processing tool according to claim 5, wherein the receptacle has an insertion bevel, and said centering element is configured to interact only with the insertion bevel.

9. The processing tool according to claim 1, which further comprises a holding device configured to elastically hold the component in the ready position.

10. The processing tool according to claim 9, wherein said holding device is configured for feeding the component individually to said guiding device, and said holding device has at least one elastically mounted latch arm.

11. The processing tool according to claim 1, wherein said guide element and said punch are configured as a press-in tool for pressing a clinch element into the workpiece.

12. The processing tool according to claim 1, wherein said elongated slots begin at a bottom end of said bush and extend over only a portion of a length of said bush.

13. The processing tool according to claim 1, wherein said guide element is stationarily clamped in place in said hold-down.

14. A processing tool for transferring a component from a ready position into a processing position, comprising:

a punch configured to transfer the component from the ready position into the processing position;

a guide element for guiding the component from the ready position into the processing position;

said guide element being a bush exerting an elastic holding force on the component, said bush having a first end and a second end, said bush having a fastening flange at said first end, said bush having a plurality of circumferentially distributed spring tongues extending from said fastening flange, said spring tongues being defined by a plurality slots formed in said bush and extending in a longitudinal direction of said bush from said second end towards said fastening flange; said punch for pressing the component through said bush against the elastic holding force;

and said fastening flange being clamped between a hold-down and a feed unit.

15. A method of transferring a component from a ready position into a processing position, which comprises:

providing the device according to claim 1;

transferring the component into the ready position with the punch, by pressing the component through the guide element with the punch against the elastic force.

16. The method according to claim 15, which comprises effecting the elastic force with one or more elastic side walls of the guide element.

17. The method according to claim 15, which comprises pressing a clinch element into the workpiece.

18. The method according to claim 15, which comprises the punch having a punch end with a centering element, and inserting the centering element into a receptacle of the component.

19. The method according to claim 15, which comprises holding the component elastically against the punch in the ready position.

* * * * *